E. A. SPERRY.
REFLECTING SURFACE FOR OPTICAL INSTRUMENTS.
APPLICATION FILED DEC. 8, 1917.

1,283,943.  Patented Nov. 5, 1918.

*(Gas Filled Tubes)*

INVENTOR
Elmer A. Sperry.
BY
Herbert H. Thompson
ATTORNEY

UNITED STATES PATENT OFFICE.

ELMER A. SPERRY, OF BROOKLYN, NEW YORK.

REFLECTING-SURFACE FOR OPTICAL INSTRUMENTS.

1,283,943.　　　　　Specification of Letters Patent.　　Patented Nov. 5, 1918.

Application filed December 8, 1917. Serial No. 206,134.

*To all whom it may concern:*

Be it known that I, ELMER A. SPERRY, a citizen of the United States of America, residing at 1505 Albemarle road, Brooklyn, in the county of Kings and State of New York, have invented certain new and useful Improvements in Reflecting-Surfaces for Optical Instruments, of which the following is a specification.

This invention relates to optical precession instruments employing highly polished reflecting surfaces, or refracting prisms, such as coincident telemeters, sometimes known as short base range finders and the like.

In such instruments it is necessary to turn light rays at one or more sharp angles with a minimum absorption and dispersion of light. Both prisms and ordinary mirrors are employed for this purpose, but both are objectionable. The principal difficulty with a mirror, as ordinarily constructed, is the reflection from the front surface of the glass on the back of which the silver amalgam coating is placed. By this action, a secondary image is produced to one side of the principal object which obscures the latter and confuses the observer. Similar troubles are experienced with prisms while in addition prisms in general absorb a greater proportion of rays than mirrors.

The object of this invention is to so construct a mirror and its support or inclosure that double reflection may be eliminated and the losses incident to the travel of light through glass eliminated.

Referring to the drawings in which what I now consider the preferred forms of my invention are shown:

Figure 1:
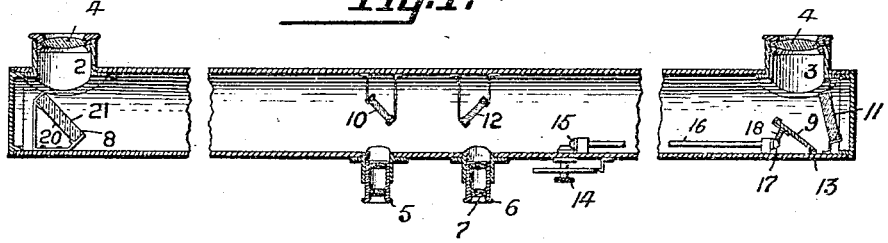
Figure 1 is a longitudinal section of an optical telemeter embodying my invention.

In the construction of the telemeter shown, a long tube 1 is provided adjacent its outer ends with openings 2 and 3 in its side walls, in each of which may be inserted a lens 4 or other focusing device. Adjacent the center of the tube one or two eye pieces 5 and 6 are located, which are preferably also provided with lenses 7. The light coming through the ends of the tube is reflected by mirrors 8 and 9. From mirror 8 the light is again reflected by mirror 10 into the eye piece 5. From mirror 9 the light may be reflected to mirror 11 and thence to mirror 12 corresponding to 9 thence to eye piece 6. Mirror 9 is shown as angularly adjustable about pivot 13 so as to set the instrument for different ranges. The setting is shown as effected from knurled knob 14 through beveled gears 15, shaft 16, and beveled pinion 17 which meshes with a toothed bar 18 on mirror 9.

Figure 4:
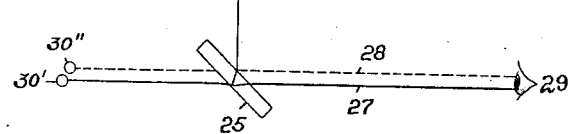
Fig. 4 is a diagram illustrating the error in the present method.

Instead of being silvered on the back 20 as is the case with the ordinary mirror, each mirror is silvered on the front 21 so that the reflecting surface is directly exposed to the air or other gas which fills the tube. While I am aware that such construction has heretofore been proposed, it has never been found satisfactory owing to the rapid tarnishing and discoloration of the silvered surface due to oxidation etc. Various coatings have been tried for the silver without success. The advantages of this construction will at once be apparent on reference to Fig. 4 in which an ordinary mirror is shown at 25. While there is only one beam 26 from object 30 which strikes the mirror, two beams 27 and 28 are reflected into the eye 29, beam 27 being the major beam and 28 the secondary beam. The result is that the eye sees two images 30' and 30''. Furthermore the main image 30' is displaced somewhat from its correct position by refraction of the beam 26 as it enters and leaves the glass in front of the mirror. Consequently, not only is confusion produced by the production of two images, but the major image is deflected from its true position. Where several mirrors are employed in succession, as in Fig. 1, this action becomes serious, since each reflection doubles the number of images produced. In order to retain the advantages of silvering the front of the mirror and at the same time render the construction durable I remove the oxygen and other gases or vapors which attack silver surrounding these surfaces preferably displacing them with an inert gas such as dry nitrogen, hydrogen or the like. Preferably the entire tube is filled with said gas, so that all of the reflecting surfaces therein may be protected. If desired, the gases within the tube may be placed under a slight pressure, so that there will be no tendency for air to leak in. Also, I prefer to use a gas having as nearly the same index of refraction as air.

Figure 2:
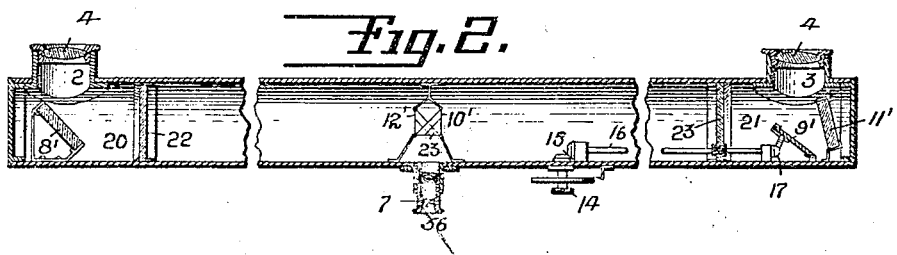
Fig. 2 is a similar section showing a slight modification.
Figure 3:
Fig. 3 is an enlarged section of one of the mirrors.

In Fig. 2, a modification is shown in which the silvered mirrors 8', 9' and 11' are placed in air tight compartments 20 and 21, being separated from the rest of the tube by glass partitions 22 and 23, the inert gas being confined in the ends of the tube beyond the partitions. In this instance, the central mirrors 10' and 12' are shown as of the usual construction, having prisms 23 placed over the silvered surface. Mirror 12' is shown as placed in line with and in front of mirror 10', both mirrors reflecting into a common eye piece 56.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an optical instrument, the combination with an inclosure, of an exteriorly silvered surface therein, and an inert fluid also within said inclosure.

2. The combination with an optical instrument, of an exteriorly silvered surface therein, said instrument containing an inert gas surrounding said surface.

3. A telemeter comprising a tube, reflecting mirrors mounted therein which are silvered on their upper surfaces, the gases or vapors within the tube which would tarnish said surface having been removed.

4. The combination with an optical instrument, of an exteriorly silvered surface therein, said instrument containing an inert gas under superatmospheric pressure surrounding said surface.

5. The method of protecting a silvered reflecting surface which consists in maintaining an atmosphere of inert gas in contact with said surface.

6. The method of preventing multiple images in an optical instrument comprising a reflector which comprises providing an opaque light-reflecting substance on the front face of the reflector and surrounding said substance by an inert gas.

7. The method of preventing multiple images in an optical instrument comprising a reflector which comprises providing an opaque light-reflecting substance on the front face of the reflector and surrounding said substance by an inert gas having substantially the same index of refraction as air.

8. The combination with an optical instrument, of an exteriorly silvered surface therein, said instrument containing an inert gas surrounding said surface having substantially the same refractory index as air.

In testimony whereof I have affixed my signature.

ELMER A. SPERRY.

Copies of this patent may be obtained for five cents each, by addressing the "Commissioner of Patents, Washington, D. C."